Oct. 22, 1940.        D. W. WILSON ET AL        2,219,214
                        CONTACT CHAMBER
            Filed May 18, 1938        2 Sheets-Sheet 1
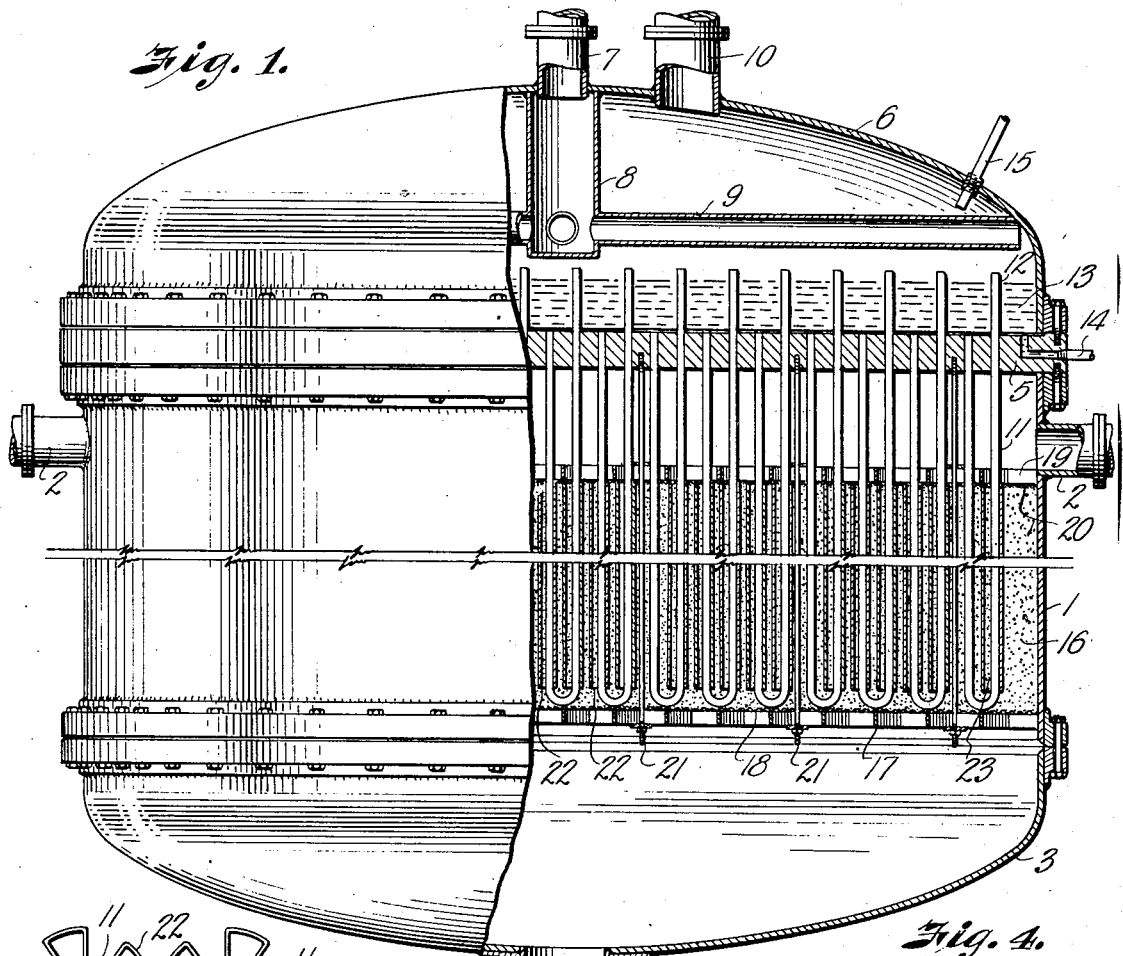
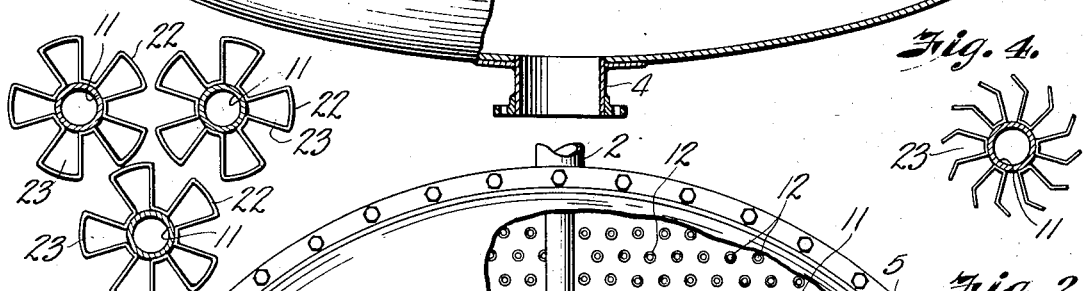
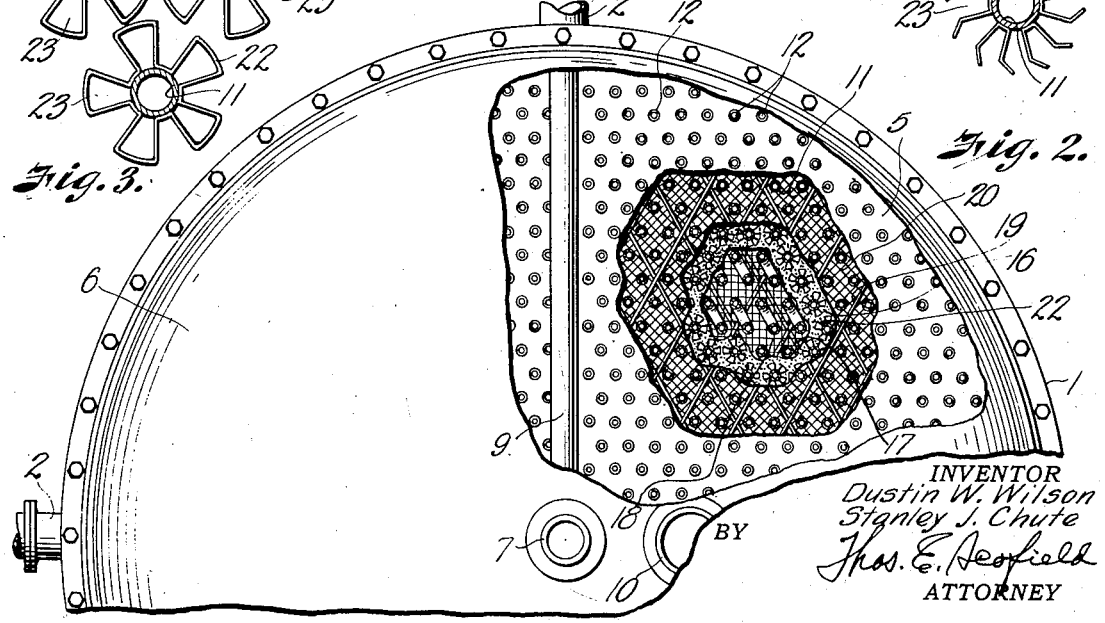
INVENTOR
Dustin W. Wilson
Stanley J. Chute
BY Thos. E. Scofield
ATTORNEY

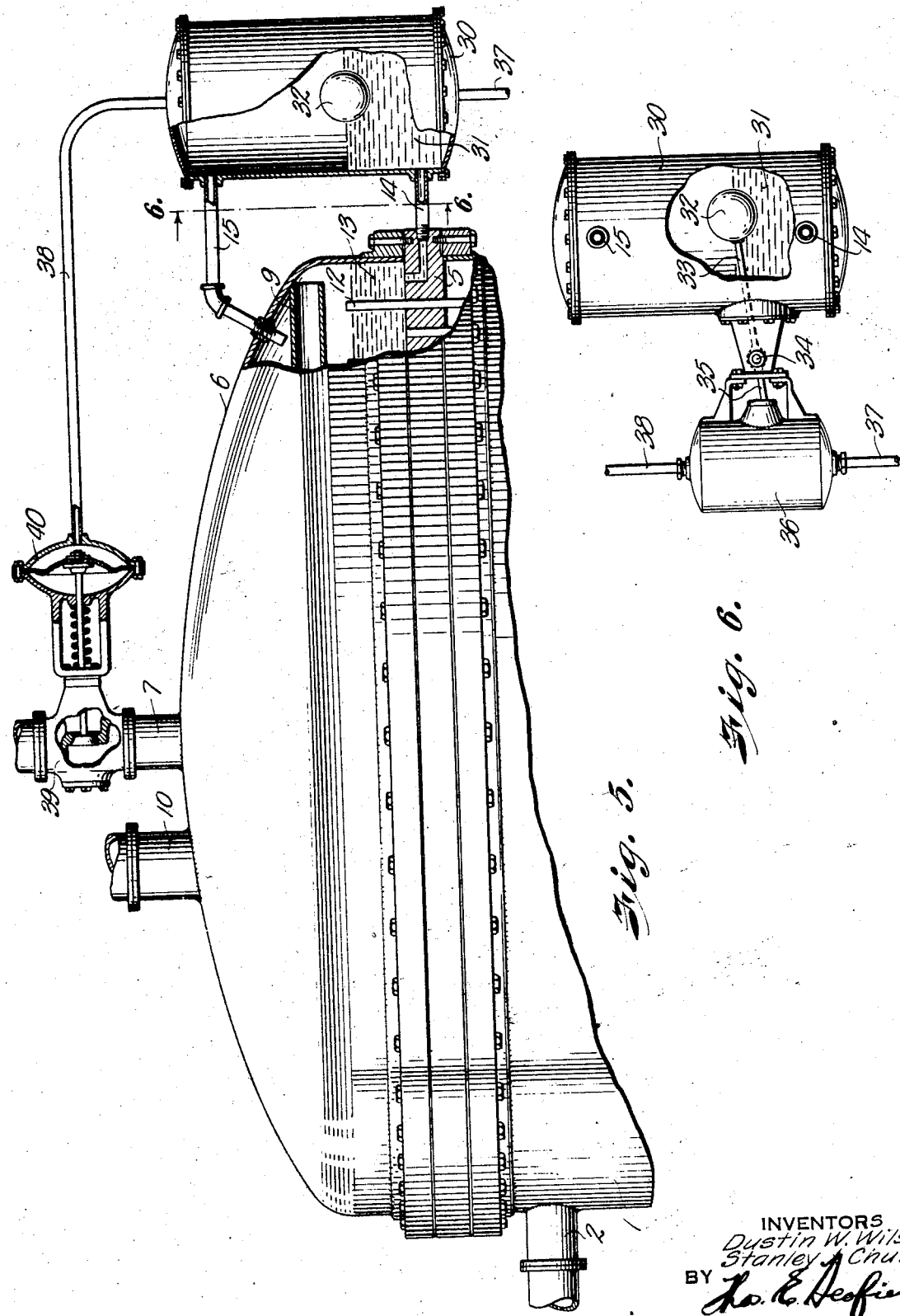

Patented Oct. 22, 1940

2,219,214

UNITED STATES PATENT OFFICE 2,219,214

CONTACT CHAMBER

Dustin W. Wilson, Scarsdale, N. Y., and Stanley J. Chute, Ridgewood, N. J., assignors to The M. W. Kellogg Company, New York, N. Y., a corporation of Delaware Application May 18, 1938, Serial No. 208,638

7 Claims. (Cl. 23—288)

Our invention relates to contact chambers, and more particularly to a catalytic contact chamber provided with heat exchange means adapted to be used to control the catalytic reaction.

In many processes employing catalysts, the reaction is exothermic, so that it is necessary to remove large quantities of heat.

One object of our invention is to provide a catalytic contact chamber in which a large area of heat exchange surface is provided in a minimum of space.

Another object of our invention is to take advantage of the latent heat of vaporization in removing heat from an exothermic reaction.

Other and further objects of our invention will appear from the following description.

In the accompanying drawings which form part of the instant specification and which are to be read in conjunction therewith, and in which like reference numerals are used to indicate like parts in the various views;

Fig. 1 is an elevation of a contact chamber according to our invention with parts in section.

Fig. 2 is a top plan view of the contact chamber shown in Fig. 1 with parts broken away.

Fig. 3 is a top plan view of a detail of the metal fins.

Fig. 4 is a top plan view of a detail of an alternate type of fin.

Fig. 5 is a fragmentary detail view similar to Fig. 1 showing the liquid level control for the water compartment.

Fig. 6 is a section taken along the line 6—6, Fig. 5.

More particularly, referring now to the drawings, the chamber comprises a cylindrical portion 1, provided with a plurality of gas inlets 2 through which the gas to be subjected to the synthesis reaction is adapted to enter. Secured to the bottom of the cylindrical portion 1 is a head 3 provided with an outlet 4 for removing the synthesis products from the reaction zone.

A tube sheet 5 is secured to the top of the cylindrical portion 1, and a head 6 forms a chamber with the tube sheet.

It will be noted that the tube sheet 5 divides the casing formed by the chamber 1 and the head 6 into two compartments, a water compartment above the tube sheet, and a catalytic compartment below the tube sheet.

An inlet connection 7 leads to a water manifold 8 provided with a plurality of water distributing pipes 9. An outlet connection 10 is adapted to conduct away steam formed by heat from the exothermic synthesis reaction. Secured in the tube sheet 5 are a plurality of U-tubes 11, as can be readily seen by reference to Fig. 1. The U-tubes are formed with one leg 12 extending upwardly above the other end of the U-tube. Water 13 in the chamber formed by the head 6 and the tube sheet 5 is kept at the level shown in the drawings, below the tops of legs 12 of the U-tubes 11. A liquid level control shown in Fig. 5 is adapted to be connected by pipes 14 and 15 to control the water supply through water inlet connection to maintain the water level within the water chamber. The pipes 14 and 15 lead to a chamber 30 and are adapted to maintain the level of the liquid 31 in the chamber 30 at the same point as that within the water compartment above the tube sheet 5. A float 32 is connected to an arm 33 and pivoted at 34. Another arm 35 is connected to arm 33 and extends into a control device 36. Compressed air from any suitable source passes into the control device through pipe 37. Pressure of the air is controlled by the control device as a function of the position of the float 32. The controlled compressed air leaves the control device 36 through pipe 38, and is adapted to control valve 39 through a diaphragm control device 40. The diaphragm control device 40 is responsive to the pressure of the air within pipe 38. If the liquid level within the water compartment rises, the float 32 will rise decreasing the pressure of the air in pipe 38 and hence upon the diaphragm control device 40, permitting the control device to move the valve 39 toward closed position. If the liquid level within the water compartment drops beyond a predetermined point, the float 32 will operate the control device 36 to permit the pressure of the air within pipe 30 to increase moving the valve 39 to permit an increased flow of water into the water compartment. The chamber is supported upon trunnions (not shown) attached to the shell body to support the chamber in a vertical position and permit rotation of the chamber through a 180° angle. The empty chamber is upset or reversed when it is to be charged with catalyst. In order to reverse the chamber it will, of course, be necessary to disconnect the gas, steam and water connections. The lower head 3, the tie rod nuts, the steel bar grid 17, and fine wire mesh screen 18 are removed. The catalyst is charged, being evenly distributed throughout the chamber. The chamber may be vibrated to settle the catalyst. The lower screen, bar grid and tie rod nuts are then replaced and the chamber reversed to an upright position, where the gas, steam and water connections are made. When the catalyst is spent and must be revived or regenerated, the lower head, as well as the tie rod nuts, bar grid and lower screen are removed while the chamber is in an upright position. After regeneration to recharge the chamber, the steps previously described are followed to recharge the catalyst.

A body of finely divided catalyst 16 is supported upon a grid 17 of steel bars and a fine screen wire mesh 18 attached thereto. A grid 19 of steel bars and an upper fine mesh screen 20 acts as a baffle construction, preventing the displacement of the catalyst by the incoming gases. A plurality of tie rods 21 are fitted to extend between the tube sheet 5 and the grid 17 to help support the catalyst body. Each leg of the U-tube extending through the catalyst body is provided with sheet metal fins 22 providing extended heat exchange surface. These fins may be of any suitable form, such as shown in Figs. 3 and 4, where the fins are adapted to contact the U-tube and extend out into the body of catalyst. The fins are preferably of metal and are stamped or formed from a thin, plain sheet of metal. They are attached to the tube walls by any suitable method such as brazing, welding or otherwise fastening to obtain a metal to metal bond between the fin and tube walls, which increases heat transfer. The fin having the closed chambers as shown in Fig. 3 has its edges welded or brazed to hold the assembly intact.

The catalytic material is a poor conductor of heat and the heat exchange fins may be made out of any suitable material. The spaces 23 formed by the fin members are also filled with catalytic material, and the tubes are closely spaced so that no portion of the catalyst will be very far removed from metallic heat conducting surfaces.

It will be observed that we have accomplished the object of our invention. We have provided an efficient catalytic contact chamber in which the exothermic heat of reaction may be removed, and in which advantage is taken of the latent heat of vaporization of water. The U-tubes are constantly filled with water from the top reservoir 13 and as steam is formed it vaporizes and is exhausted through the legs 12 of the U-tubes by thermosyphon action. By means of our construction we are enabled to control the process temperature of the catalyst within narrow limits by regulation of the steam pressure exhausted from the U-tubes.

By means of our construction we are enabled to supply an extremely large percentage of the volume for the catalyst. For example, in a catalyst chamber of our construction, 12 feet in diameter and 24 feet in length, we have available 2150 cubic feet for the catalyst.

While this chamber has been explained and described in connection with catalytic reactions, it is applicable as well to many types of heat exchange, particularly to cases where on the finned side of the exchanger gas cooling or heating is involved. In such instances the heat transfer coefficient is low and the amount of heat to be transferred is relatively small; consequently particular advantage is derived by use of large surfaces such as are provided by this construction.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. In a device of the character described, a casing, a tube sheet therein adapted to divide said casing into a water compartment and a catalytic compartment, and U-tubes attached to said tube sheet so as to extend into said catalytic compartment and have the open ends thereof communicate with said water compartment, with one leg thereof extending a substantial distance beyond said tube sheet into said water compartment.

2. In a device of the character described, a casing, a horizontally disposed tube sheet forming a partition therein dividing said casing into a water compartment above said tube sheet and a catalytic compartment below said tube sheet, U-tubes suspended from said tube sheet to extend downwardly into said catalytic compartment with the open ends thereof communicating with said water compartment and each U-tube provided with an extended leg portion extending upwardly above said tube sheet a substantial distance, means for supplying water to said water compartment and maintaining it at a constant level, and means for supplying the material to be treated to the catalytic compartment and withdrawing it after treatment.

3. In a device of the character described, a casing, a horizontally disposed tube sheet therein forming a partition dividing the interior of said casing into a water compartment and a catalytic compartment, a pair of spaced, perforated, retaining walls disposed in said catalytic compartment to form a catalytic retaining means, U-tubes set in said tube sheet so as to extend downwardly into said catalytic compartment while the open ends thereof communicate with the water compartment above said tube sheet, each U-tube having one leg thereof extended a substantial distance above said tube sheet, means for supplying water to said water compartment and maintaining it at a level below the top of the extended legs of the U-tubes, and openings in said casing for removing steam from the water compartment and for supplying and withdrawing the material to be treated in the catalytic compartment.

4. In a device of the character described, a partition dividing said device into a water compartment and a catalytic compartment, U-shaped cooling tubes extending from said water compartment into said catalytic compartment, the open end of one leg of each of said tubes terminating adjacent to the bottom of said water compartment and the open end of the other leg of each tube extending a substantial distance above the bottom of said water compartment so that water in said water compartment may be maintained at such a level that the open end of the extended leg will be above the surface thereof whereas the open end of the other leg of each tube will be below the surface, means for supplying and maintaining a substantially constant water level in said water compartment, means for removing the steam therefrom, and means for supplying to and withdrawing from the catalytic compartment the material there to be treated.

5. In a catalytic contact chamber, a casing, a tube sheet positioned within said casing, a plurality of U-tubes suspended from said tube sheet, each of said U-tubes having two legs, one of said legs extending upwardly past said tube sheet through a distance greater than the other of said legs, a grid positioned within said casing below said tube sheet, catalytic material suported on said grid, the depending portions of said U-tubes being in heat exchange contact with said catalytic material, a header for said tube sheet forming a compartment therewith, means for introducing water into said compartment, means for introducing gas to be subjected to synthesis into said casing for contact with said catalytic material, and means for withdrawing gas from said casing after it has passed into contact with said catalytic material.

6. A catalytic contact chamber as in claim 5 in which said water chamber is provided with a liquid level control for maintaining the level of water therein below said upwardly extending U-tube legs, and means for withdrawing steam from said chamber.

7. A catalytic contact chamber as in claim 5, wherein said U-tubes within said body of catalytic material are provided with a plurality of fins exteriorly thereof for providing increased heat exchange surface.

DUSTIN W. WILSON.
STANLEY J. CHUTE.